2,833,774

QUATERNIZED THIOFURAMIDE DERIVATIVES

Robert I. Meltzer, Rockaway, and John A. King, Short Hills, N. J., assignors to Warner-Lambert Pharmaceutical Company, New York, N. Y., a corporation of Delaware No Drawing. Application April 27, 1956
Serial No. 580,979

6 Claims. (Cl. 260—293.4)

This invention relates to a new series of chemical compounds of pharmaceutical value, particularly as virucidal agents.

This application is a continuation-in-part of our application Serial No. 483,445, filed January 21, 1955, now abandoned.

The new compounds of our invention may be represented by the structural formula

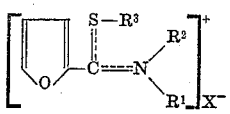

wherein $R^1$, $R^2$ and $R^3$, which are not necessarily the same, are selected from the group consisting of alkyl, alkenyl, aralkyl and aryl, $R^1$ and $R^2$ being such that they may be joined together to form saturated N-heteromonocyclic radicals having 5–6 ring atoms, and X is a radical such that $X^-$ is a quaternizing anion. Thus $R^1$, $R^2$ and $R^3$ may represent methyl, ethyl, propyl, n-octyl, allyl, benzyl, phenylethyl, phenyl, p-chlorophenyl and the like, $R^1$ and $R^2$ together with the nitrogen atom connecting them may also represent 1-piperidyl, 1-pyrrolidyl, 1-morpholinyl and the like, $X^-$ may represent chloride, bromide, iodide, monomethyl sulfate and the like.

The new compounds of our invention may be prepared by various procedures as for example those set forth below:

METHOD A

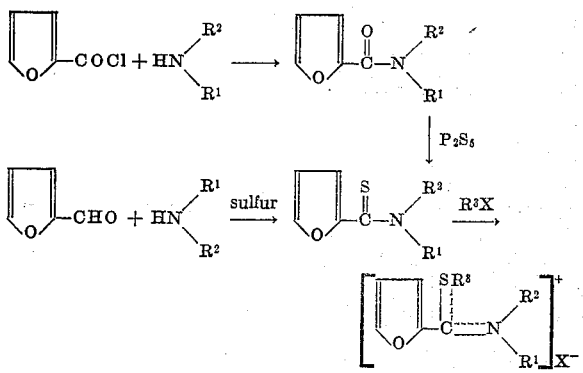

wherein $R^1$, $R^2$ and X are as indicated above and $R^3$ is alkyl, alkenyl, or aralkyl.

METHOD B

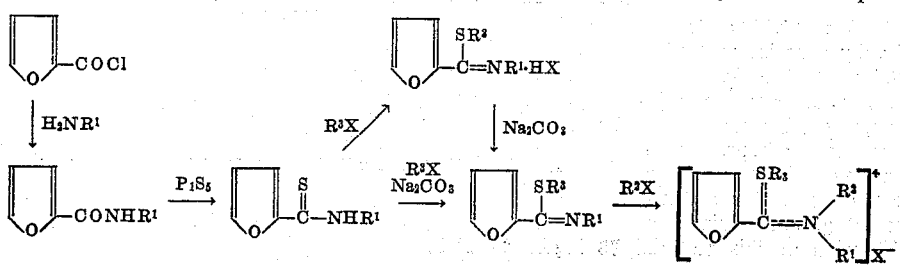

wherein $R^1$ and X are as indicated above and $R^2$ and $R^3$ are alkyl, alkenyl or aralkyl.

METHOD C

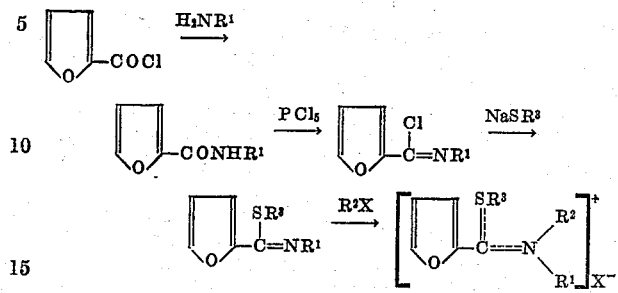

wherein $R^1$ and X are as indicated above, $R^2$ is alkyl, alkenyl or aralkyl and $R^3$ is alkyl, alkenyl, aralkyl or aryl.

The condensations of 2-furoyl chloride with amines in accordance with the above outlines of Methods A and B, may be carried out in the presence of a solvent such as ethyl ether. Conversion of the resulting amides to the corresponding thioamides may be effected either without a solvent, at about 140–150° C., or in the presence of an inert solvent such as toluene or xylene, at the reflux temperature. The condensation of furfural with secondary amines and sulfur as outlined under Method A above, is preferably performed in the presence of dry pyridine, at the reflux temperature. The quaternization reactions outlined under Methods A, B and C may be effected without a solvent; however the use of an inert solvent such as acetone is preferred.

The final product of the reaction scheme outlined under Method A might normally be assigned the Formula I whereas the final product of the reaction scheme outlined under Method B might normally be assigned the Formula II. However, in the case where $R^1=R^2=R^3=$ methyl, and X=iodine, we have found that both the Methods A and B yield the same final product. It is also possible to consider these substances as analogous to Hantzsch's pseudo salts (see C. K. Ingold, "Structure and Mechanism in Organic Chemistry," Cornell University Press, Ithaca, N. Y., 1953, p. 575 et seq.), and to picture them in the form of Formula III, in which the covalent carbon-iodine bond so closely approaches an ionic bond as to cause the compounds to react as if they had the structure of Formula IV.

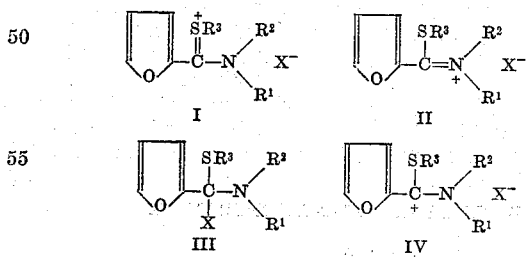

All these formulae are probably contributory to the true structure, the actual predominance of one form over another being dependent upon the individual compound, the solvent and the other components of the reaction mixture. To encompass this conception, and lacking further proof of structure, we have selected Formula V as a practical generic representation of the compounds of our invention.

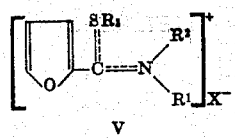

It will be noted that method C above is the only one of the three methods outlined which may be used to prepare the compounds of our invention wherein $R^3$ is aryl.

The compounds of our invention are of high utility in that they possess virucidal activity. Thus methyl N-methyl-2-thiomurimidate methiodide has been shown to afford protection against the lethal effects of Influenza A (PR 8) in mice at a dose level of approximately 11 milligrams per kilogram of body weight. The new compounds may be used therapeutically by parenteral administration of aqueous solutions thereof or by oral or rectal administration of the substance either in pure form or in admixture with various fillers, vehicles, carriers and other types of commonly used pharmaceutical excipients.

Typical examples of compounds of our invention which may be prepared by the methods discussed above, are as follows:

Methyl N-methyl-2-thiofurimidate methiodide
Methallyl N-methyl-2-thiofurimidate methochloride
Benzyl N-methyl-2-thiofurimidate methobromide
Methyl N-benzyl-2-thiofurimidate ethiodide
Phenyl N-methyl-2-thiofurimidate methosulfate
Methyl N-phenyl-2-thiofurimidate methiodide
N-(2-thiofuroyl)morpholine methiodide
N-(2-thiofuroyl)piperidine methiodide The following examples illustrative of the several embodiments of our invention will provide a more complete understanding of this invention.

Example I

A. N-METHYL-2-THIOFURAMIDE

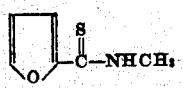

A mixture of 10.5 g. (0.084 mole) of N-methylfuramide, 10.5 g. (0.047 mole) of powdered phosphorus pentasulfide and 170 ml. of dry toluene was maintained at the reflux temperature for 2 hours, whereafter the mixture was filtered. The resulting filtrate was evaporated to dryness under vacuum and the resulting dark, crystalline residue was extracted five times with 150 ml. portions of hot hexane. On cooling, the clear hexane extracts deposited a total of 6.9 g. of the desired product, M. P. 71.5–72.5° C.

B. N,N-DIMETHYL-2-THIOFURAMIDE

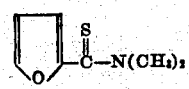

*Method 1.*—A solution of 27.4 g. (0.21 mole) of 2-furoyl chloride in 50 ml. of anhydrous ice-cold ether was added to a solution of 28.4 g. (0.63 mole) of dimethylamine in 200 ml. of anhydrous ether and the mixture was allowed to stand at room temperature for one hour. It was then refluxed for another hour, cooled, filtered, and the resulting filtrate was evaporated to dryness. Recrystallization of the residue from petroleum ether (B. P. 60–68° C.) gave 20 g. (68% yield) of N,N-dimethyl-2-furamide. Sulfuration of this material was effected in the same manner as described in Example 1 and the resulting N,N-dimethyl-2-thiofuramide melted at 34.5–35° C.

*Method 2.*—A solution of 14.4 g. (0.15 mole) of furfuraldehyde in 58 ml. of dry pyridine was heated to reflux with stirring, and 7.2 g. (0.225 mole) of sulfur was then added. Dimethylamine was then passed into the mixture at a rate sufficient to keep the mixture at reflux temperature without the application of external heat. After thirty minutes no further dimethylamine was being absorbed so the addition was stopped and the mixture was externally heated to reflux for one and one half hours. The pyridine was removed under vacuum and the residue was extracted with petroleum ether (B. P. 60–68° C.) whereupon the pure product was recovered from the extract by fractional crystallization (M. P. 34.5–35° C).

C. METHYL N-METHYL-2-THIOFURIMIDATE METHIODIDE

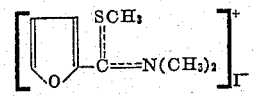

*Method 1.*—To a solution of 4.2 g. (0.027 mole) of N,N-dimethyl-2-thiofuramide in 25 ml. of acetone was added 15.4 g. (0.108 mole) of methyl iodide. An exothermic reaction took place and after a lapse of 5 minutes the reaction mixture was nearly solid. It was then refluxed and filtered. The crude product (7.6 g., M. P. 117–120° C.) was recrystallized from a mixture of acetone and ether whereupon 3.7 g. of the desired material was obtained melting at 128–128.5° C.

*Method 2.*—Methyl iodide (32 g., 0.225 mole) was added to 6.8 g. (0.048 mole) of N-methyl-2-thiofuramide and the mixture was refluxed on the steam bath for thirty minutes whereafter the mixture was chilled, filtered. The solid collected on the filter was then washed with methyl iodide whereupon 13.2 g. of methyl N-methyl-2-thiofurimidate hydriodide (M. P. 105–107° C.) was obtained. To 2 g. (0.007 mole) dissolved in a minimum quantity of water there was added a solution of 0.83 g. (0.008 mole) of sodium carbonate in a minimum quantity of water. The resulting alkaline solution was extracted four times with ether and the ether extract was dried over anhydrous magnesium sulfate and then evaporated to dryness. The residual methyl N-methyl-2-thiofurimidate was dissolved in 10 ml. of acetone and 2.5 ml. (0.048 mole) of methyl iodide was added thereto and the mixture was allowed to stand five days at room temperature. The crystalline product was removed by filtration (1.3 g.) and recrystallized from acetone to obtain the desired product, M. P. 128° C.

Example II

BENZYL N-METHYL-2-THIOFURIMIDATE METHIODIDE

Benzyl bromide (8.6 g., 0.050 mole) was added to N,N-dimethyl-2-thiofuramide in 20 ml. of acetone. The following day the reaction mixture was filtered to remove the resulting precipitate and the latter was washed with 20% of ether in acetone. The white solid thus obtained (5.7 g.) was recrystallized from a mixture of acetone and ether, giving the desired product melting at 94–95° C.

Example III

METHALLYL N-METHYL-2-THIOFURIMIDATE METHOBROMIDE

By substituting methallyl bromide for benzylbromide in Example II above, the desired compound was obtained melting at 136–136.5° C.

Example IV

ALLYL N-METHYL-2-THIOFURAMIDE METHIODIDE

By substituting allyl iodide for benzyl bromide in Example II above, the desired compound was obtained melting at 70–72° C.

Example V

PHENYL N-METHYL-2-THIOFURIMIDATE METHIODIDE

A mixture of N-methyl-2-furamide (52 g.) and thionyl chloride (116 ml.) was heated under reflux for on hour, whereafter the excess thionyl chloride was removed by distillation under vacuum. Distillation of the residue on a steam bath under a pressure of 20 mm. of mercury gave a solid which was identified as N-methyl-2-furimino chloride. To a solution of this material (22 g.) in 200 ml. of a 1:1 mixture of acetonitrile and benzene was added sodium thiophenolate (29.6 g.) in 200 ml. of benzene. The resulting mixture was heated under reflux and then concentrated almost to dryness by distillation under vacuum, and the residue was taken up in ether, centrifuged and the resulting supernate was filtered through a fluted filter paper. The resulting filtrate was treated with an excess of methyl iodide. Upon standing for a few days there separated a precipitate which was collected by filtration. Recrystallization of this material from a mixture of acetone and ether gave the desired product melting at 175–176° C.

Example VI

N-2-(THIOFUROYL)PIPERIDINE METHIODIDE

Piperidine (192 g., 2.25 mole) was added to a mixture of pyridine (750 ml.), sulfur (72 g., 2.75 mole) and furfural (144 g., 1.5 mole) maintained under reflux; the addition of piperidine was made at such a rate as to maintain reflux without external heating. Refluxing was continued for 2 hours whereafter the reaction mixture was concentrated by distillation under vacuum, and the residue was extracted with petroleum ether. The petroleum ether extract was chilled, filtered and the resulting precipitate was collected on a filter and recrystallized from light boiling petroleum ether. The resulting pure N-(2-thiofuroyl)piperidine melting at 55–56° C. was dissolved in acetone and treated with an excess of methyl iodide. The crystals which quickly separated from the reaction mixture were collected on a filter and recrystallized from a mixture of ether and acetonitrile to give the desired N-(2-thiofuroyl)piperidine methiodide melting at 125–126° C.

Since certain changes may be made in the compounds described without departing from the scope of our invention, it is intended that all matter contained in the above description shall be interpreted as illustrative, and not in a limiting sense.

We claim:

1. A new chemical compound represented by the structural formula:

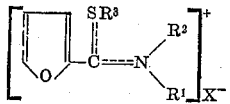

where $R^1$ and $R^2$ are members of the group consisting of methyl, and taken together, a piperidyl and morpholinyl group, $R^3$ is a member of the group consisting of methyl, allyl, methallyl, phenyl and benzyl, and X is a member of the group consisting of bromine and iodine.

2. The new chemical compound methyl N-methyl-2-thiofurimidate methiodide represented by the formula

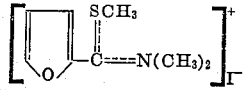

3. The new chemical compound allyl N-methyl-2-thiofurimidate methiodide represented by the formula

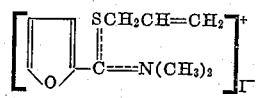

4. The new chemical compound benzyl N-methyl-2-thiofurimidate methobromide represented by the formula

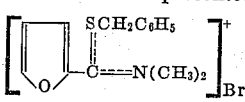

5. The new chemical compound phenyl N-methyl-2-thiofurimidate methiodide represented by the formula

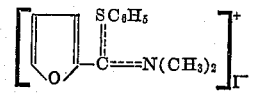

6. The new chemical compound N-(2-thiofuroyl)-piperidine methiodide represented by the formula

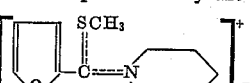

References Cited in the file of this patent

UNITED STATES PATENTS

| | | |
|---|---|---|
| 2,560,035 | Alliger | July 10, 1951 |
| 2,560,046 | Alliger | July 10, 1951 |